(12) United States Patent
Nakamura (10) Patent No.: US 7,397,816 B2
(45) Date of Patent: Jul. 8, 2008

(54) RELAY DEVICE

(75) Inventor: Toshihiko Nakamura, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 775 days.

(21) Appl. No.: 10/999,932

(22) Filed: Dec. 1, 2004

(65) Prior Publication Data

US 2005/0226147 A1 Oct. 13, 2005

(30) Foreign Application Priority Data

Apr. 6, 2004 (JP) ............................. 2004-112283

(51) Int. Cl.
*H04L 12/66* (2006.01)
(52) U.S. Cl. ..................................... 370/463
(58) Field of Classification Search ................. None
See application file for complete search history.

(56) References Cited

U.S. PATENT DOCUMENTS 5,633,865 A * 5/1997 Short ........................ 370/412
6,067,300 A * 5/2000 Baumert et al. ............. 370/413
6,167,029 A * 12/2000 Ramakrishnan ............. 370/235
7,167,927 B2 * 1/2007 Philbrick et al. ............ 709/250

FOREIGN PATENT DOCUMENTS

JP 2003-099396 4/2003

OTHER PUBLICATIONS

Shivam et al, EMP: Zero-copy OS-bypass NIC driven Gigabit Ethernet Message Passing, ACM, pp. 1-8, 2001.*

* cited by examiner

*Primary Examiner*—Frank Duong
(74) *Attorney, Agent, or Firm*—Rabin & Berdo, P.C.

(57) ABSTRACT

A data relay device transmitting received unit data has an external interface unit, a main control unit, where the received unit data are received from outside the data relay device and transmitted to the corresponding destination memory not through the main control unit. The external interface unit is equipped with memory in the external interface, the threshold setting unit, and the external control unit. The main control unit receiving the threshold receiving notice reads the information in the corresponding field of the received unit data stored in the memory in the external interface and judges whether the received unit data should be transmitted, or not. The main control unit deletes the received unit data judged to be unnecessary before the transmitting.

10 Claims, 5 Drawing Sheets

FIG. 6

RELAY DEVICE

BACKGROUND OF THE INVENTION

1. Field of the Invention

The present invention generally relates to a relay device. More specifically, the present invention relates to a relay device, for example, that is preferably applied to transmission of a MAC frame received from a network within the relay device.

2. Background Information

Figure 2:
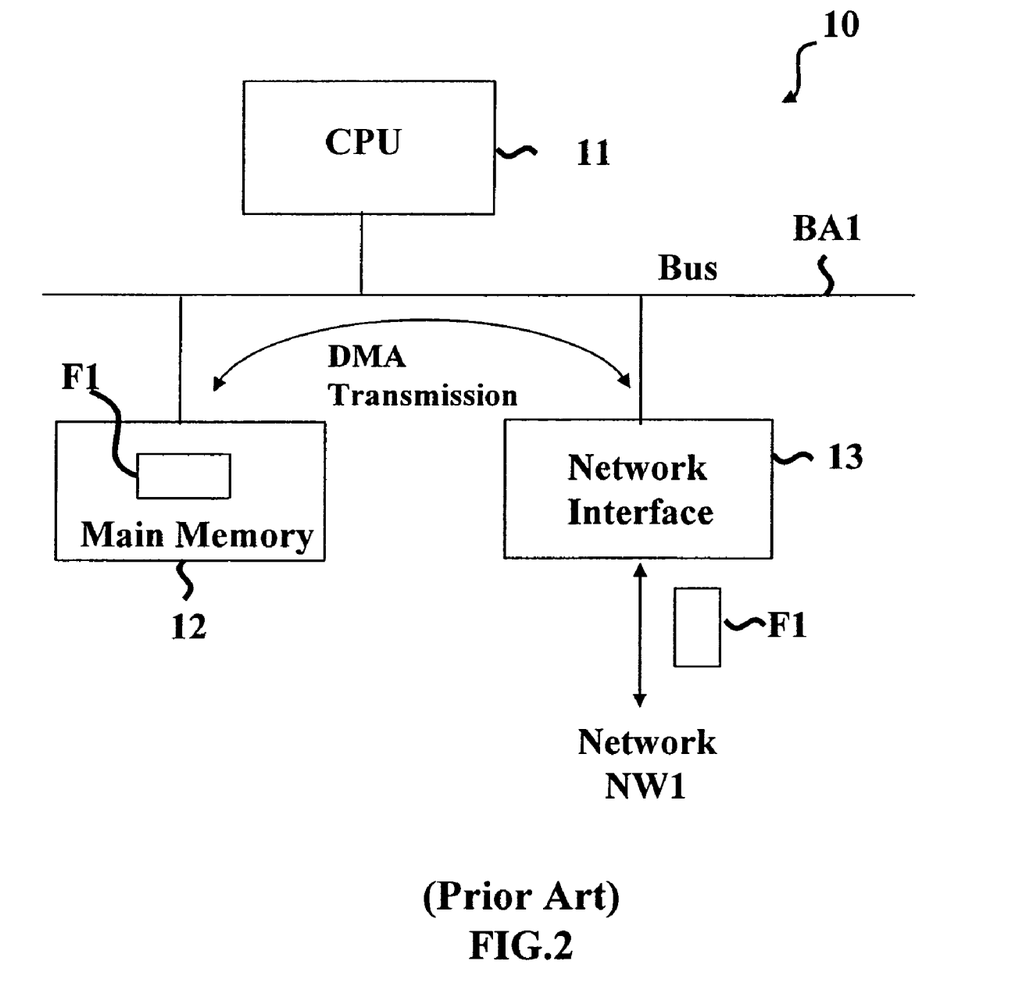
FIG. 2 is a view of a schematic diagram illustrating a configuration of a conventional frame relay device.

A conventional internal configuration of a relay device having a function of transmitting a MAC frame received from a network, is illustrated in FIG. 2. In the frame transmission device 10 illustrated in FIG. 2, a CPU (Central Processing Unit) 11 conducts the final control of each component. A network interface 13 receives a frame F1 from an external network NW1. The frame F1 then proceeds via a DMA (Direct Memory Access) transmission. During the DMA transmission, the network interface 13 transmits the frame F1 to the main memory 12 through the bus BA1 without the CPU 11. Consequently, even when the CPU 11 is conducting other processes, the frame F1 can be transmitted to the main memory 12 to realize a high-speed frame transmission.

After the frame F1 is transmitted to the main memory 12, the CPU 11 determines how to handle the frame F1 based on the information read from each field of the frame F1. For example, according to this decision, the contents of the frame the F1 are processed in the frame transmission device 10, sent by other network interfaces (not illustrated) to other external networks different from the network NW1, or instantly deleted.

A conventional frame relay device, for example, is shown in Japanese Patent Application 2003-099396, which is hereby incorporated by reference However, when the frame F1 transmitted to the main memory 12 via the DMA transmission includes deleted frames as described above, it can be said that using the bus BA1 to transmit the frame F1 is a waste of consumption of internal resources and judging by the CPU 11 after the DMA transmission, and effectively leads to resource availability deterioration due to the waste of the operation resources.

Figure 3:
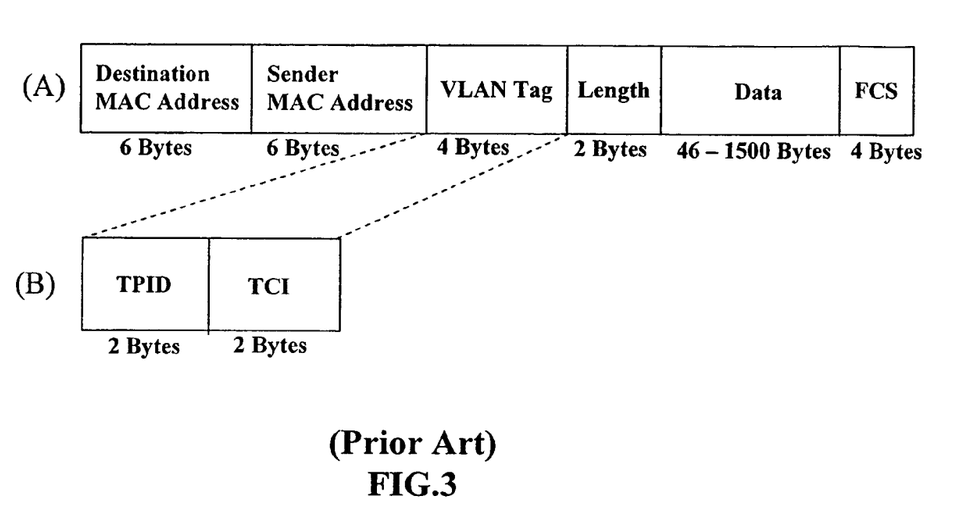
FIG. 3 is a view of a schematic diagram illustrating a view of a format of a VLAN frame.

For example, when a VLAN (Virtual LAN) is set, since frames sent from senders of the same VLAN group having the same values of VLAN-IDs (VLAN numbers) are necessary, those frames are processed inside, or relayed, while frames sent from the different group senders having the different VLAN-IDs are to be deleted. Since the location of the field including the VLAN-ID (VLAN Tag) is fixed according to IEEE 802.1 Q in the frames and the format of MAC frame is shown in FIGS. 3(A) and (B), the frame relay device can recognize the VLAN-ID by checking the contents of the frames.

Figure 4:
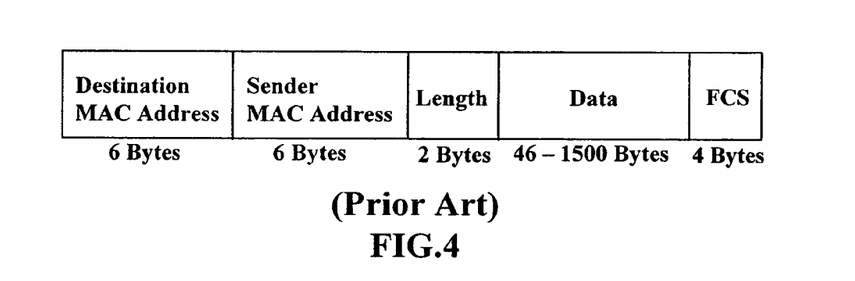
FIG. 4 is a view of a schematic diagram illustrating a conventional MAC frame.

While, in the case of a frame relay device that only processes the VLAN frame, the deletion of the frame can be also determined by recognizing no VLAN tags in the ordinary MAC frames illustrated in FIG. 4.

In the case of broadcasting, a deletion similar to the aforementioned one might occur. The frame broadcast (broadcast frames) is the frame addressed to all non-designated terminals, and is often used in LANs for exchanging information, for example, in a DHCP or ARP. The terminal receiving the frame (frame relay) determines whether the frame sends the necessary information to the terminal itself or not by information other than the sending MAC address. When the frame is not necessary to the terminal, the terminal deletes the frame.

However, if the network interface 13 is only mulch-functioned to reduce waste of the resources arising in the aforementioned deletion, the circuit configuration of the network interface 13 will be complicated and flexibility deterioration or development costs increase will occur because the circuitry must be changed in case the communication protocol used in the network (ex. NA1) is expanded.

This will come from the fact that most of functions of the network interface 13 usually need to be realized by hardware. The reason most of the functions of the network interface 13 are realized by hardware is as follows. Since the function of the network interface 13 belongs to the lower layer of the model referred to OSI, for example, the data-link layer, the processing on this layer will be bottlenecked to the upper layer unless the processing speed on this layer is much faster than the software processing speed of the CPU 11, and it will bring much deterioration of the throughput of the communication application.

In view of the above, it will be apparent to those skilled in the art from this disclosure that there exists a need for an improved relay device. This invention addresses this need in the art as well as other needs, which will become apparent to those skilled in the art from this disclosure.

SUMMARY OF THE INVENTION

To solve the aforementioned problem, according to a preferred embodiment of the present invention, a relay device includes an external interface. The external interface transmits a received data unit having a predetermined configuration from outside the device to a corresponding memory unit, not through the main control unit on the direct memory transmission method.

The external interface includes a memory unit on the side of the external interface, a threshold setting unit, and a control unit on the side of the external interface.

(1) The memory unit on the side of the external interface stores the received data unit from the top to the bottom.
(2) The threshold setting unit sets a threshold for the data quantity from the top of the stored data unit in the memory unit on the side of the external interface.
(3) The control unit on the side of the external interface sends a predetermined reaching to the threshold notice to the main control unit, when the data quantity from the top of the stored data unit in the memory unit on the side of the external interface reaches to the threshold.
(4) The main control unit reads the information of the corresponding field of the stored data unit in the memory unit on the side of the external interface after receiving the reaching to the threshold notice, and then determines whether the received data unit needs to be relayed to the corresponding memory unit or not. According to the decision, the received data unit that does not need to be transmitted is deleted before being transmitted to the corresponding memory.

According to the present invention, the effective availability and flexibility of resources will be improved.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

The preferred embodiment of the present invention will be explained below referring to a case in which a relay device according to a first preferred embodiment of the present invention is applied to a frame relay.

Figure 1:
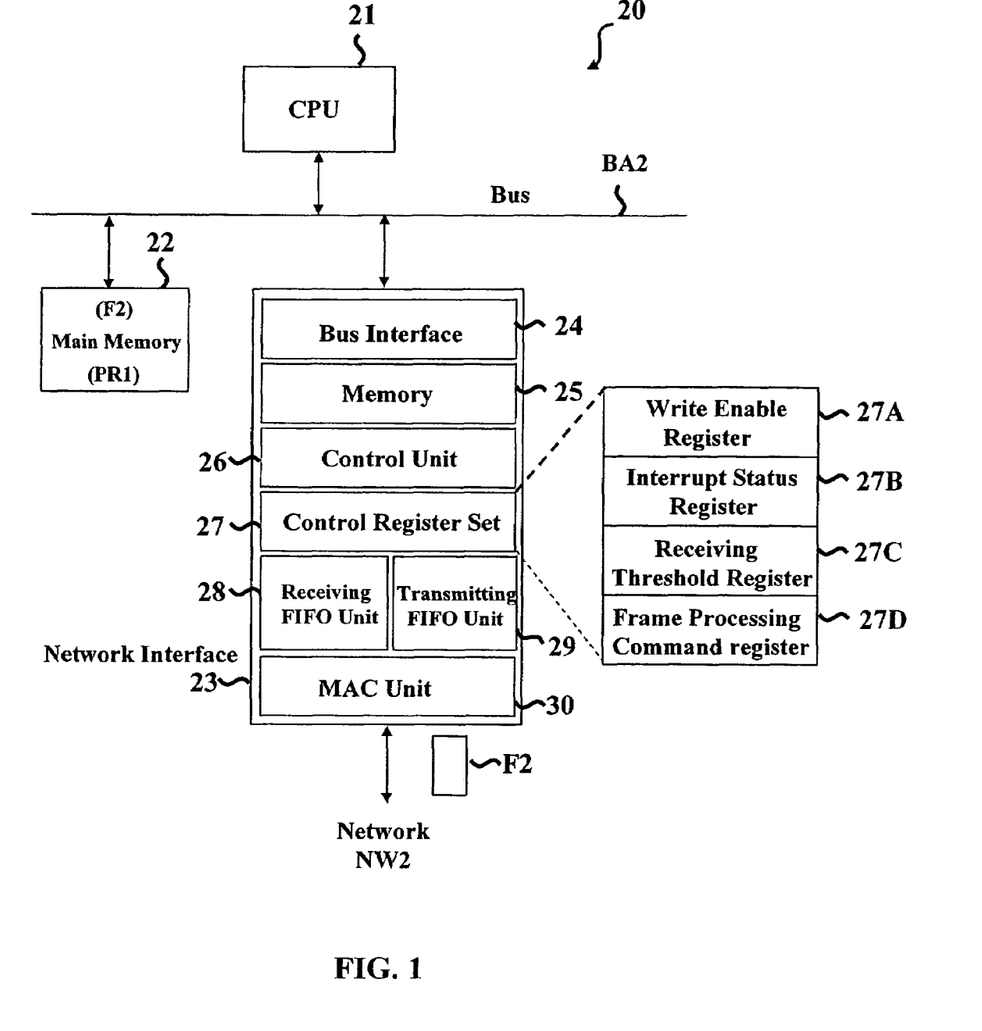
FIG. 1 is a view of a schematic diagram illustrating a whole configuration of a frame relay device according to a first preferred embodiment of the present invention.

The configuration of a whole frame relay device 20 according to the first preferred embodiment the present invention is illustrated in FIG. 1. The frame relay device 20 can be regarded as a part of a personal computer (including a LAN card) or a part of a relay device, such as a layer-2 switcher or a rooter. If the frame device is considered a relay device, however, one or a plurality of networks other than the illustrated network interface 23 can exist.

In FIG. 1, the frame relay device 20 includes a CPU (Central Processing Unit or Main Control Unit) 21, a main memory 22, a network interface 23, and a bus BA2.

The bus BA2 herein is a transmission path in the frame relay device 20 installed to connect the CPU 21, the main memory 22, and the network interface 23 together. Since the transmission path to bridge between the three components is basically only the bus BA2, it is reasonable that the bus BA2 is utilized for purposes other than DMA transmission of the frame F2.

The CPU 21 is an operation device having a function that ultimately controls each component (including the main memory 22 and the network interface 23) in the frame relay 20.

The main memory 22 can be directly accessed by the CPU 22. In the main memory 22, the frame F2 transmitted from the network interface 23 can be stored via DMA transmission, as well as by many kinds of control programs, including a control program PR1 of the main memory 22. When the frame relay device 20 starts to run, for example, the control program PR1 is written into the main memory 22 from a ROM (Read Only Memory) or a hard disk drive, etc. The ROM or the hard disk drive is not illustrated herein.

The control program PR1 includes a protocol processing program that processes, for example, a communication protocol in upper layers higher than the network layer in the OSI referred model.

The network interface 23 is only one piece of hardware connected directly to an external network NW2 among the system components 21-23 of the frame relay 20 and the bus BA2. The network interface 23 functions to transmit the frame F2 received from the network NW2 to the main memory 22 via a DMA transmission method according to need.

As shown in FIG. 1, the network interface 23 includes a bus interface 24, a memory 25, a control circuit or unit 26, a control register set (threshold setting unit) 27, a receiver FIFO unit 28, a transmitting FIFO unit 29, and a MAC unit 30.

The MAC unit (Media Access Control) 30 hereof conducts a control of access to media herein. For example, the MAC unit 30 processes communication protocol corresponding to the data link layer according to the OSI referred model (ex. IEEE802:CSMA or CD).

The difference in physical layers of the transmission media is absorbed in the MAC unit 30 hereof. Consequently, there is no need to detail the specifications of the physical layer of the network NW2 in a configuration according to the embodiments of the present invention. Thus, the present invention is applicable to radio communications. However, wired transmission paths (ex. twisted pair cable) are usually used for the IEEE802.3. In this embodiment, the network NW2 connected to the network interface 23 is specifically a twisted pair cable.

Since two FIFO units 28 and 29 are both first-in-first-out types, the first-written frame hereof is read out first. The receiving FIFO unit 28 hereof is used when the frame F2 is received from the external network NW2. However, since the preferred embodiment of the present invention relates to the transmission of the received frame F2 in the device 20, the receiving FIFO unit 28 is more important than the transmitter unit 29 in terms of the configuration of the preferred embodiment of the present invention.

The memory 25 is the memory resource in the network interface 23. The frame F2 is first written in the receiving FIFO unit 28, and is written into the memory 25 being read thereof when the frame F2 is read out from the receiving FIFO unit 28. When the relay device 20 relays the frame F2, it is deleted. In this case, since deleting the frame F2 as soon as possible leads to improvements in saving many kinds of resources (a memory resource like the memory 25 or an internal transmission resource like the bus BS2), the deleting is done even if a part of one frame F2 is being written into the memory 25 and the rest thereof (for example, the beginning part) is being stored in the receiving FIFO unit 28.

Reading-out (ex. from the receiving FIFO unit 28) or writing-in (ex. to the memory 25) of one frame thereof can be done, for example, on one-byte batch, though it depends on the definite specifications of the frame relay 20.

The control unit 26 is a processor that controls each element of the components 24, 25, and 27-30 in the network interface 23. The control unit 26 also compares the receiving threshold information (explained below) with data quantity of the frame F2 stored in the memory 25.

The control register set 27 is a complex of registers used by the control unit 26 or the CPU 21. In other words, the control register set 27 has an interrupt table register 27A, an interrupt status register 27B, a receiving threshold register 27C, and a frame processing command register 27D included therein.

The interrupt enable register 27A writes the control information indicating whether an interrupt to halt the program running by CPU 21 can be done or not. A transmission-completion-notice permission, a reaching-to-receiving-threshold notice, and a reaching-notice permission are set in the interrupt enable register 27A. The transmission-completion-notice permission indicates whether transmissioncompletion-notice from the control unit 26 to CPU 21 can be done or not in case the frame F2 is transmitted from the network interface 23 to the main memory 22 by the DMA transmission method. The reaching-to receiving-threshold-notice permission indicates whether the reaching-to-receiving-threshold-notice can be done or not, where the reaching-to-receiving-threshold-notice is a notice sending a message that the data quantity of the frame F2 reaches the predetermined receiving threshold. Since the notices are categorized as interrupts to the CPU 21, it is the CPU 21 that processes the settings.

The interrupt register 27B is a register in which the control unit 26 sets the information indicating the transmission-completion notice or the reaching-to-receiving-threshold notice. The setting is done by the control unit 26 and is read out by the CPU 21.

The receiving-threshold register 27C sets the information indicating the value of the receiving threshold (receiving-threshold information). The way in which the receiving threshold information is set can be varied greatly. For example, the setting can be done by the CPU 21 according to a direction from a user of the frame relay device 20. The receiving-threshold information set in the receiving threshold register 27C is read out when data quantity of the frame F2 stored in the memory 25 is compared with the receiving threshold thereof.

The frame processing command register 27D is a register for which the CPU 21 sets commands relating to the processing of the frame F2 to the control unit 26. The commands are set by the CPU 21 and are read out by the control unit 26. For example, the commands may direct the deletion of the frame F2 or the transmittal of the frame F2 via the DMA transmission method.

The bus interface 24 is an interface between each component in the network interface 23 (ex. the control unit 26, etc.), and the bus BA2. The bus interface 24 has functions such as controlling the right to use the bus BA2. If a plurality of transmission sources, for example, the CPU 21 or the control unit 26 were to use the bus BA2 to send data (ex. the frame F2, and so on) at the same time, a collision could cause destruction of the data. Thus, the aforementioned control is indispensable in preventing collisions.

The behavior of the preferred embodiment having the aforementioned configuration will be explained hereinafter, and the case the network interface 23 receiving the frame F2 from the network NW2 will be described as an example.

(A-2) The Behavior of the First Embodiment of the Present Invention.

When the frame F2 is received in the network interface 23 from the network NW2, the frame F2 is written in the receiving FIFO unit 28 through processing by the MAC unit 30.

At this instance, if an unprocessed frame doesn't exist on the memory 25 and a frame written in the receiving FIFO unit 28 prior to the frame F2 also does not exist, the frame F2 is read, for example, one byte by one byte from the beginning thereof and written into the memory 25. During the writing of the frame F2, for example, the control unit 26 compares the data quantity of the frame F2 written in the memory 25 with the threshold set in the receiving threshold register 27C. If the comparative result is that the data quantity is detected to reach to the receiving threshold, the control unit 26 outputs the reaching-to-receiving-threshold notice. In this case, the control unit 26 obviously according to this disclosure searches the setting contents in the interrupt enable register 27C, etc.

Necessary frames to the frame relay device 20 are frames used therein or need to be relayed. Unnecessary frames don't need to be used therein or relayed. Frames that are used therein include frames such as DHCP or ARP transmitted in a LAN to exchange control information and have relations with the device itself and frames having user data used in the installed communication application therein (for example, data used in communication application like e-mail or Web). It is when the frame relay device 20 is a part of a personal computer that the frames having user data are judged to be used therein.

Whenever the CPU 21 judges that the frame F2 is an unnecessary frame for the frame relay device 20, the CPU 21 sets the delete command in the frame processing command register 27D, and the CPU 21 sets the DMA command when the frame F2 is judged to be a necessary frame. In case the frame relay device 20 is equipped with a plurality of network interfaces, the DMA transmission can include the frame F2 transmission from the network interface 23 to another network interface or interfaces. On the contrary, if the network interface of the frame relay 20 is only the network interface 23, the transmission destination can only be the main memory 22.

When the delete command is set in the frame processing register 27D, the control register set 27 deletes the corresponding frame F2 as soon as the control register set 27 reads out the delete command. The definition of the frame F2 delete, which is how the control register set 27 specifically processes, can have many variations. One of those definitions, which is handling the area of the memory 25 where the frame 21 has already been written as the not-written area, defines an easy way to discern deletion. Of course, the ending part of the frame F2 still remaining in the receiving FIFO unit 28 at this moment can be handled in the same way.

When the aforementioned deletion is done, not only are memory resources of the receiving FIFO 28 and the memory 25 saved, but also the external transmission resources like the bus BA2 are conserved because the unnecessary frame to the frame relay device 20 cannot be transmitted via the DMA method, and the use of the memory resource of the DMA transmission destination (the main memory 22 therein) is avoided as well. Furthermore, since the CPU 21 does not need to access to the main memory 22 through the bus BA2 many times to process the frame F2 stored in the main memory 22 unless the frame F2 is not transmitted to the main memory 22 via the DMA method, the internal transmission resource thereof is conserved as described in the aforementioned point. At the same time, in the case the DMA transmission command is set in the frame processing command register 27D, the control unit 26 reading out the command transmits the frame F2 via the DMA method from the network interface 23 to the main memory 22 through the bus BA2. When the DMA method transmits the frame F2 to the main memory 22, the control unit 26 conducts the transmission-completion notice.

Upon receiving the transmission-completion notice through the bus BA2, the CPU 21 processes the frame F2 stored in the main memory 22 via the DMA transmission method according to the control program PR1 or the like. The processing can have various types, though, the processing steps can be extracted from the user data stored in the frame F2 and display of the contents of Web pages or e-mail, or conducted according to the communication protocol (for example, IP protocol) in upper layers higher than the data-link layer of the OSI-referred model.

It is obvious according to this disclosure that the CPU 21 must access (read-out or write-in) the main memory 22 many times through the bus BA2 to do the processing.

The effect of the First Embodiment of the Present Invention.

According to this embodiment, the memory resources such as the main memory 22 and the internal transmission resources can be saved or conserved, and consequently, real availability of the resources therein can be improved. This effect is due to the fact that unnecessary frames to the frame relay 20 can be deleted instantly according to the reaching-to-receiving-threshold notices and then wasteful DMA transmissions can be avoided.

Further, since the software process of the CPU 21 corresponding to the control program PR1 judges whether the received frame F2 is necessary to the frame relay 20 or not, the flexible responding can be done only by installing a new program into the CPU 21 when the communication protocol is expanded therein, and so on.

The installing can be easily done into the frame relay device 20 already set and under operation, and is much less costly compared with developing changing hardware design even when a new product of the frame relay device has been developed.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Alternate Embodiments

Alternate embodiments will now be explained. In view of the similarity between the first and second embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Embodiment

Figure 5:
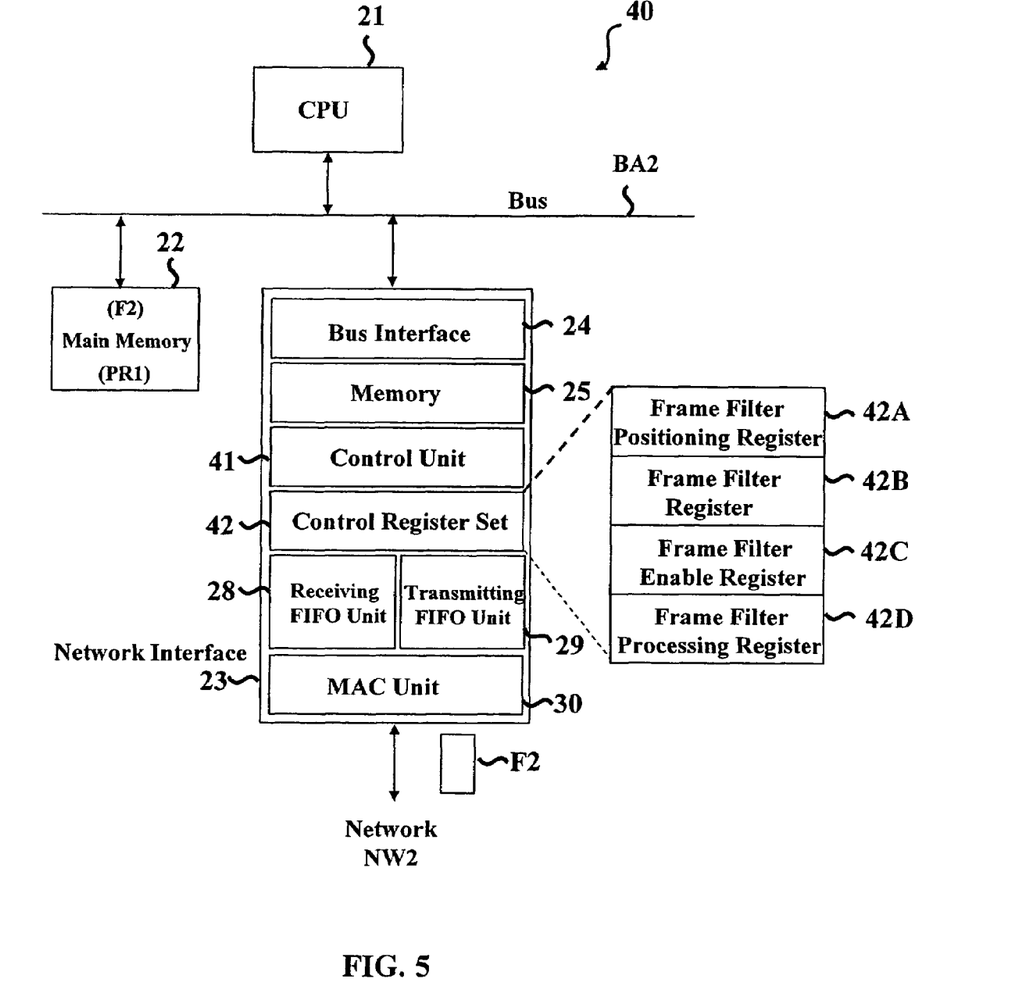
FIG. 5 is a view of a schematic diagram illustrating a whole configuration of a frame relay device according to a second preferred embodiment of the present invention.

Only points of this embodiment that highlight significant differences from the first embodiment will be explained below. The configuration and behavior of the second embodiment of the present invention A configuration of a whole frame relay device 40 according to a second preferred embodiment of the present invention is illustrated in FIG. 5. Since, in FIG. 5, each component labeled with the same signs 21-25, 28-30, BA2, and NW2 as those in FIG. 1 has the same or similar function according to the first embodiment of the present invention, detailed explanation thereof will be omitted.

A control circuit or unit 41 in FIG. 5 corresponds to the control unit 26 and the control register 42 corresponds to the control register 27. The control register 42 according to this embodiment of the present invention is also equipped with the registers 27A-27D as shown in FIG. 1, and consequently one of its functions is the same as the control register 27 according to the first embodiment of the present invention. However, a feature of this embodiment of the present invention is to have a plurality of register settings for many kinds of information that allows the control unit 41 to judge whether the received frame F2 is necessary or not. In other words, although the control register 42 is equipped with the registers 27A-27D, it also has a frame filter positioning register 42A, a frame filter register 42B, a frame filter enable register 42C, and a frame filter processing register 42D.

The frame filter positioning register 42A sets the information that indicates the checking position of the frame F2 for the aforementioned judging of whether the frame is necessary or not. For example, a TPID (Tag Protocol Identifier) or a TCI (Tag Control Information) illustrated in lines A and B of FIG. 3 is determined by the frame-filter-positioning information therein. Further, the TPID is located in from the 13th to the 14th byte from the top of the MAC Frame (ex. F2). Since the corresponding value of TPID has the given value (0x8100) when the MAC frame is a VLAN frame corresponding to the VLAN, the VLAN frame can be detected by checking whether the TPID has the given value or not. Furthermore, checking the value of the VLAN-ID can be done by checking the VLAN-ID described in the TCI next to the TPID therein.

Referring again to FIG. 5, the frame register processing register 42D sets the information indicating the procedure to the frame therein (processing information). This setting is done by the CPU 21 and is read out by the control unit 41. One of the specific examples indicated by the processing information is deleting the frame (in this case: F2) within the corresponding the network interface 23, or the DMA transmission, when the corresponding frame meets the filter information described below. Furthermore, the DMA transmission having the different destination can be set by the different processing therein. As described before, the main memory 22 or other network interfaces can be the destination of the DMA transmission.

The frame filter register 42B sets the information (filter information) to be compared with the information at the location of the frame F2 indicated by the filter location information set in the frame filter location register 42A. The processing corresponding to the processing information is done, according to the results of comparing the filter information. The frame filter enable register 42C sets the advisability of the processing corresponding to the processing information set in the frame filter register 42D.

Furthermore, the plurality of conditions (condition determined by the combinations of the different kinds of filter information and the processing information indicating how to process the frame according to the filter information) can be set by the plurality of registers 42A-43D. In other words, the control unit 41 sends the reaching-to-receiving-threshold notice when the data quantity of the frame F2 written in the memory 25 reaches the receiving threshold set in the receiving threshold register 27C, and the control unit 41 processes the corresponding frame F2.

Though all received frames (one of them: F2) can be processed properly without processing by the CPU 21, if all cases were covered by the plurality of registers 42A-42D, it would lead to too many functions in the network interface 24. Thus, an overly complicated or excessively large scale circuit configuration would result therein. Then, consequently, a deterioration of flexibility or an increase in development costs thereof arises. The CPU 21 judges the advisability thereof to avoid these problems. The effect of the second embodiment of the present invention.

According to the second embodiment of the present invention, an effect that is almost the same as that of the first embodiment of the present invention can be achieved. In addition, since the control unit 41 in the network interface 23 often conducts the processing directed by the processing information for the CPU 21 according to this embodiment, the CPU 21 load thereof can be reduced and then the processing speed therein can be increased by the shortened delay time on the transmission therein.

Third Embodiment

Only points of this embodiment that highlight significant differences from the first or the second embodiment will be explained below.

This embodiment of the present invention relates to a frame relay device having two network interfaces.

A whole configuration of a frame relay device 50 according to a third preferred embodiment of the present invention is illustrated in FIG. 5. The frame relay device 50 has two network interfaces shown in FIG. 6 that correspond to a relay device, for example, like the aforementioned layer-2 switch or rooter. Since in FIG. 6 the functions of components having the same signs 21-30, BA2, or NW2 as those in FIG. 1 have the same or similar functions to those of the first embodiment of the present invention, the specific explanation of the components thereof will be omitted.

Figure 6:
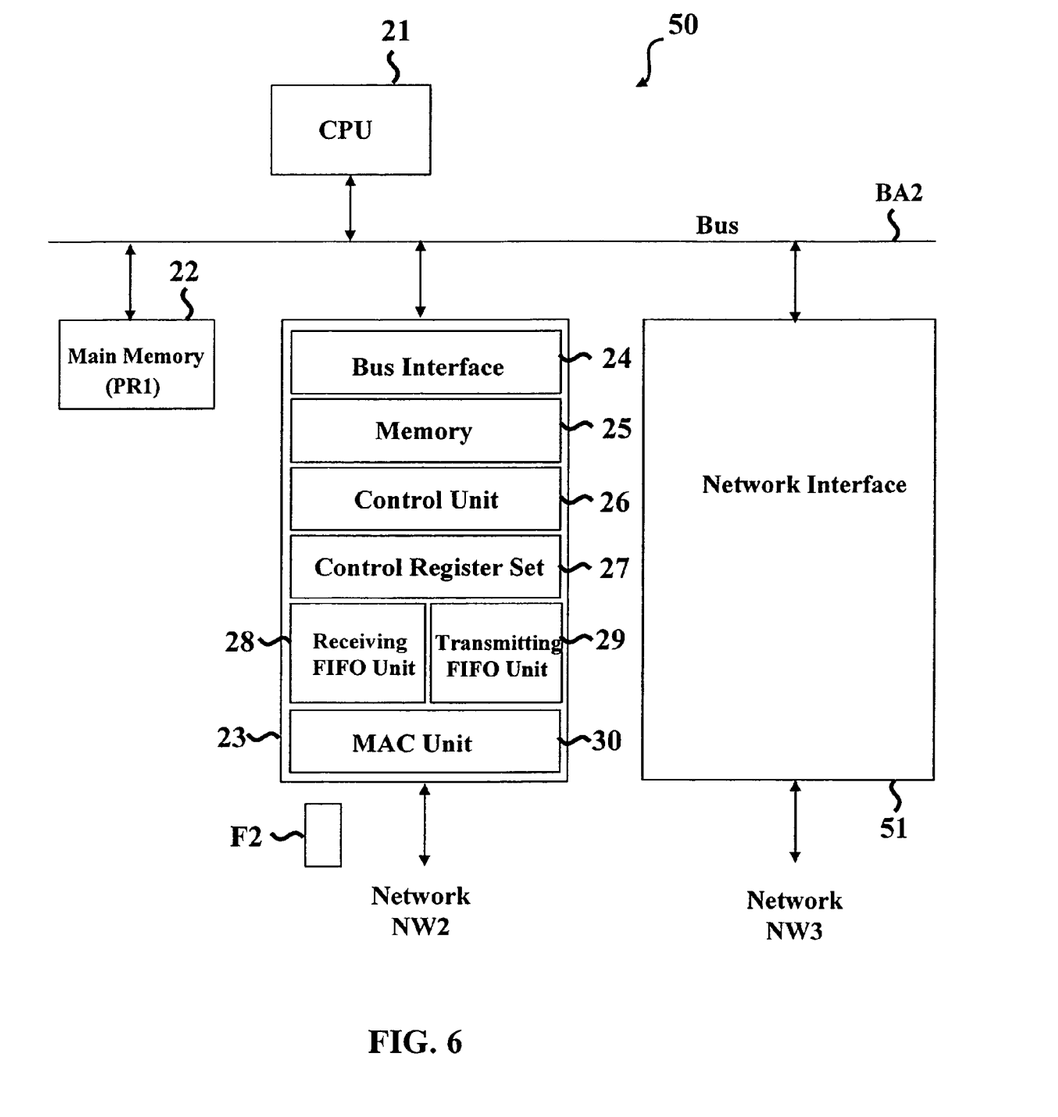
FIG. 6 is a view of a schematic diagram illustrating a whole configuration of a frame delay device according to a third preferred embodiment of the present invention.

The network interface 51 newly added to this embodiment of the present invention is connected to a network NW3, while the network interface 23 is connected to the network NW2. However, the internal configuration of the network interface 51 is the same as the network interface 23.

The network interface NW3 represents a broadcast domain different from the network NW2 (or a different subnet). In this embodiment, the frame relay device 40 can be a layer-2 switch or the like and the networks NW3 and NW2 can represent network domains that are different from each other. Further, in this embodiment, the frame relay device 40 can be a rooter or the like and the networks NW3 and NW2 can represent subnets that are different from each other.

As described in the first embodiment of the present invention, when there are a plurality of network interfaces, two cases of the DMS transmission of the frame F2 from a network interface (ex. 23) can exist. The first case is one in which the main memory 22 is the destination of the DMA transmission and the second case is one in which another network interface (herein 41) is the destination.

In the case of FIG. 6, it is obvious according to this disclosure that one frame relay device 50 can have more than three ports, though the number of network interfaces (i.e. ports) shown is two.

The Effect of the Third Embodiment of the Present Invention

This embodiment of the present invention can realize the same or similar effect as the first embodiment although it has a different configuration from that of the first embodiment.

Other Embodiments

The effect of the first, second, or third embodiment of the present embodiment can be combined in different ways from the aforementioned ways.

For example, the control register 27 in FIG. 6 can be replaced with the control register 42 in FIG. 5, not according to the three embodiments of the present invention. In this case, the processing corresponding to the processing information can be done in the network interface 24 or 51.

However, it is possible that the information of the aforementioned registers that do not need to be changed during the operation of the frame-relay device can be stored in non-volatile memory device like EEPROM replaced with the registers.

Since the present invention relates to the transmission of the received frame in the frame relay device therein, it is applicable to a limited to receiving frame device not having a transmission function.

Most of the aforementioned functions implied by the hardware can be realized by the software and vice versa.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to the corresponding Japanese Patent Application, the entire disclosure of which is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A relay device using the Direct Memory Access method comprising:
    a main control unit; and
    an external interface unit being configured to receive receiving data from outside, said external interface being configured to transmit directly said receiving data to a corresponding destination memory independent of said main control unit, said external interface unit comprising,
        a memory unit being configured to store said receiving data as stored data in descending order said receiving data,
        a threshold setting unit being configured to set a threshold corresponding to a quantity of said stored data, and
        a control unit being configured to send a predetermined reaching threshold notice to said main control unit upon a data quantity of said stored data reaching a predetermined threshold,
    said main control unit being configured to delete said receiving data judged as deletion data being unnecessary upon judging whether said receiving data unnecessary to be transmitted to said corresponding destination memory upon said main control unit receiving said reaching threshold notice and reading corresponding information of a field of said stored data stored.

2. The relay device according to claim 1, wherein said control unit deletes said deletion data before transmitting said receiving data to said corresponding destination memory based on a judging result of said main control unit corresponding to contents of a predetermined register before said data quantity measured from a top of said stored data stored reaches said threshold.

3. The relay device according to claim 2, wherein said control unit selects a main memory unit accessed directly by said main control unit as said corresponding destination memory.

4. The relay device according to claim 2, wherein said control unit selects a memory unit on a second external interface as said destination memory.

5. A relay device comprising:
a CPU being configured to control components;
a main memory being configured to store data, said main memory being configured to have a control program written therein to process communication protocol, said main memory being configured to be accessed by said CPU;
an external interface unit being configured to receive receiving data from outside, said external interface including,
  a memory unit being configured to store said receiving data as stored data in descending order said receiving data,
  a threshold setting unit being configured to set a threshold corresponding to a quantity of said stored data, and
  a control unit being configured to send a predetermined reaching threshold notice to said CPU upon a data quantity of said stored data reaching a predetermined threshold; and
a bus being configured to connect said CPU, said main memory, and said external interface to transmit data via Direct Memory Access transmission,
said CPU being configured to delete said receiving data judged as deletion data being unnecessary upon judging whether said receiving data unnecessary to be transmitted to said corresponding destination memory upon said CPU receiving said reaching threshold notice and reading corresponding information of a field of said stored data stored.

6. The relay device according to claim 5, wherein
said threshold setting unit is a control register set comprising,
  an interrupt table register that writes control information indicating whether an interrupt to halt the program running said CPU can be done,
  an interrupt status register in which a control unit of said external interface sets information indicating a transmission completion notice or a reaching receiving threshold notice read by said CPU,
  a receiving threshold register that sets information indicating a value of said receiving threshold, and
  a frame processing command register for which said CPU sets commands relating to processing of said receiving data.

7. The relay device according to claim 6, wherein
said control register set further comprises,
  a frame filter positioning register that sets checking information that indicates a checking position of said receiving data for judging of whether receiving data are necessary,
  a frame filter register that sets filter information to be compared with said checking information,
  a frame filter enable register that sets advisability of processing corresponding to processing information, and
  a frame filter processing register that sets said processing information.

8. The relay device according to claim 7, further comprising a plurality of external interface units.

9. The relay device according to claim 6, further comprising a plurality of external interface units.

10. The relay device according to claim 5, further comprising a plurality of external interface units.

* * * * *